US012747116B2

(12) United States Patent
Troiano

(10) Patent No.: US 12,747,116 B2
(45) Date of Patent: Sep. 29, 2026

(54) APPARATUS FOR TIPPING BOXES

(71) Applicant: Fameccanica.Data S.p.A., San Giovanni Teatino (IT)

(72) Inventor: Matteo Troiano, San Giovanni Teatino (IT)

(73) Assignee: Fameccanica.Data S.p.A.

( * ) Notice: Subject to any disclaimer, the term of this patent is extended or adjusted under 35 U.S.C. 154(b) by 441 days.

(21) Appl. No.: 18/362,304

(22) Filed: Jul. 31, 2023

(65) Prior Publication Data

US 2024/0043230 A1 Feb. 8, 2024

(30) Foreign Application Priority Data

Aug. 2, 2022 (IT) ........................ 102022000016365

(51) Int. Cl.
*B65G 65/23* (2006.01)
*B65G 47/90* (2006.01)

(52) U.S. Cl.
CPC ........... *B65G 65/23* (2013.01); *B65G 47/904* (2013.01); *B65G 2201/025* (2013.01)

(58) Field of Classification Search
CPC . B65G 65/23; B65G 47/904; B65G 2201/025
See application file for complete search history.

(56) References Cited

U.S. PATENT DOCUMENTS 2,321,300 A * 6/1943 Keagy .................... B65G 65/23 248/133
3,342,358 A 9/1967 French et al.
3,978,999 A * 9/1976 Ryder .................... B65G 65/23 414/404
4,422,814 A * 12/1983 Borders .................. B65F 3/043 414/303
4,447,185 A * 5/1984 Robinson ............... B65G 65/23 414/420
4,597,710 A * 7/1986 Kovats ...................... B65F 3/08 414/673
4,953,262 A * 9/1990 Zinser .................... A22C 11/00 254/3 R
5,895,196 A * 4/1999 Forsyth .................. B65G 65/23 414/421
6,012,891 A * 1/2000 Timmins ................ B65G 65/23 414/421
9,126,755 B2 * 9/2015 Walter ................... B65G 65/23
11,104,527 B1 8/2021 Zhao et al.
2012/0207566 A1 8/2012 Maile

FOREIGN PATENT DOCUMENTS

CN 201758718 U 3/2011
CN 112849860 A 5/2021

OTHER PUBLICATIONS

Search Report dated Mar. 8, 2023. 7 pages.

* cited by examiner

*Primary Examiner* — Jonathan Snelting
(74) *Attorney, Agent, or Firm* — RMCK Law Group PLC

(57) ABSTRACT

An apparatus for tipping boxes includes a stationary support structure, a chute fixed with respect to the stationary support structure, a movable support carrying two tipping arms, and a drive unit configured to move the tipping arms along a straight direction inclined with respect to a vertical direction, and to rotate the tipping arms around an axis parallel to a longitudinal direction.

5 Claims, 6 Drawing Sheets

APPARATUS FOR TIPPING BOXES

CROSS-REFERENCE TO RELATED APPLICATION

This application claims priority to Italian Patent Application No. 102022000016365 filed Aug. 2, 2022. The disclosure of the above applications is incorporated herein by reference in its entirety.

FIELD OF THE INVENTION

The present invention generally relates to the automatic handling of products.

More specifically, the invention relates to an apparatus for tipping boxes.

The invention has been developed in particular with a view to the automatic handling of products in production plants, automatic warehouses, shipping centers, etc., where operations of storage, sorting, distribution, packaging, shipping, etc. are carried out.

The invention was developed in particular with a view to its application in shipping centers for products sold through e-commerce channels.

DESCRIPTION OF THE PRIOR ART

In storage, sorting, packaging and shipping systems, boxes are frequently used for transporting products. The boxes containing the products are generally handled by roller or belt conveyors. When a box reaches its destination, the products contained therein are unloaded for further processing.

The emptying of the boxes may be carried out by tipping devices, which pick up the boxes and overturn them so as to release the products from the open upper sides of the boxes.

U.S. Pat. No. 11,104,527 B1 discloses a box tipping system comprising two tipping arms rotatable about a first axis and a door rotatable about a second axis. The door is applied to the upper open face of a box. Then, the tipping arms and the door jointly rotate to tip the box. During the tipping of the box, the door closes the upper open face of the box and prevents the products from escaping. When the box has completed a rotation of about 180°, the door opens and forms an inclined chute on which the products that come out of the box slide.

The box tipping system described in U.S. Pat. No. 11,104,527 B1 is affected by various drawbacks, including:

- the closing operation of the boxes with the door must necessarily be carried out before starting the tipping of the box;
- to empty the box on the door, the box must make a very wide rotation (about 180°);
- between the center of rotation of the tipping arms and the box there is a very long arm which prevents too rapid rotations, otherwise the accelerations and the consequent mechanical stresses would be too high.

Consequently, the tipping cycle of a box is quite long, in the order of about 10 seconds.

Furthermore, the tipping system described in U.S. Pat. No. 11,104,527 B1 may involve risks of damage to the products, in particular in the case wherein the boxes contain fragile products that have not yet been packaged.

OBJECT AND SUMMARY OF THE INVENTION

The present invention aims to provide an apparatus for tipping boxes that overcomes the problems of the prior art.

According to the present invention, this object is achieved by an apparatus having the characteristics forming the subject of the independent claims.

Preferred embodiments of the invention form the subject of the dependent claims.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

It will be appreciated that the accompanying drawings are schematic and that some components may not be shown to assist in understanding the Figures. Also, it will be appreciated that the various figures may not be represented on the same scale.

DETAILED DESCRIPTION

With reference to FIGS. 1-5, numeral 10 indicates an apparatus for tipping boxes 12.

Figure 1:
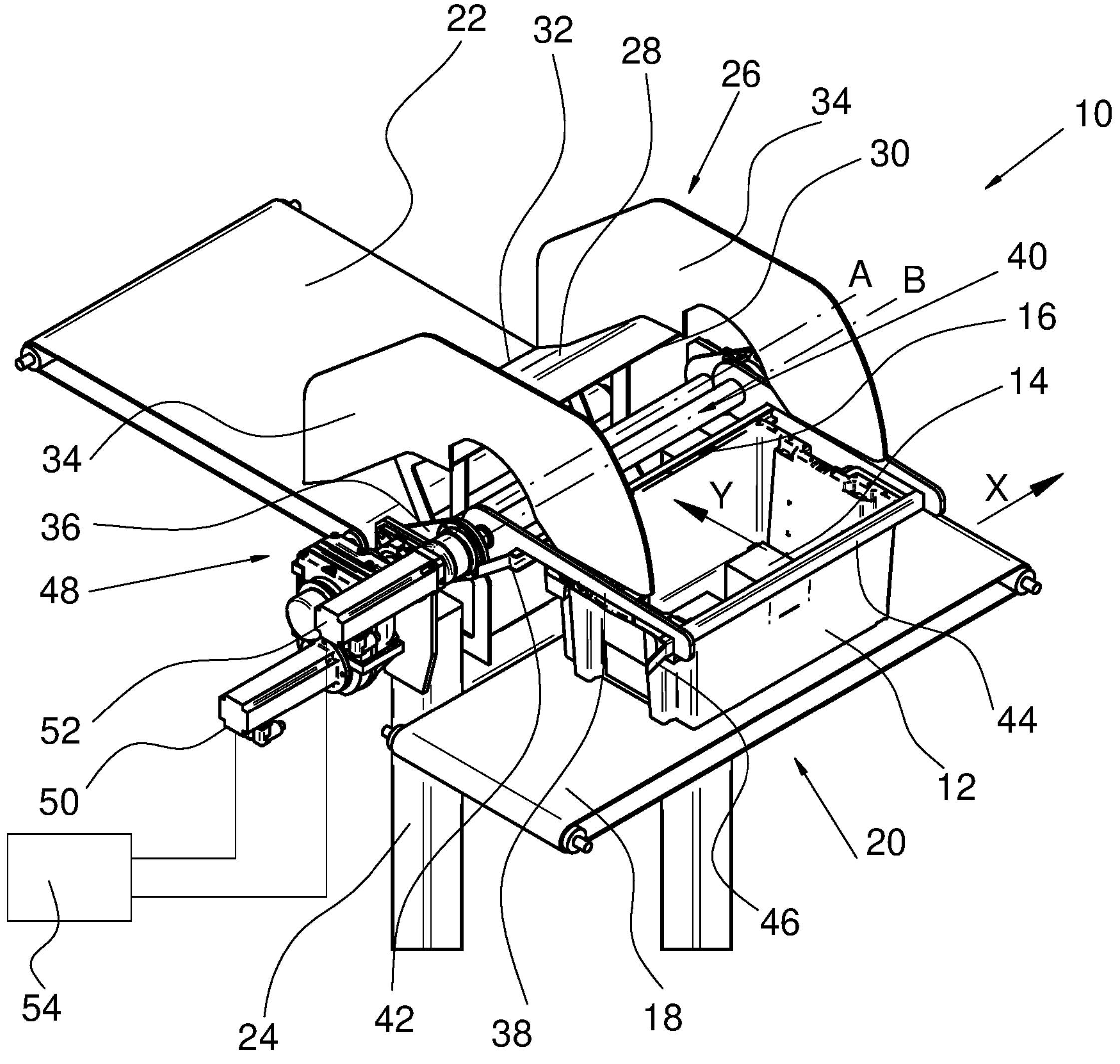
FIG. 1 is a schematic perspective view of an apparatus for tipping boxes according to an embodiment of the present invention.

The boxes 12 are used for transporting products 14 of various types in production, storage, sorting, packaging, shipping, etc. plants. The boxes 12 are usually made of plastic material and generally have a parallelepiped shape with an open upper face. Each box 12 has two upper longitudinal sides having respective outer edges 16 which protrude from the respective side walls. With reference to FIG. 1, the boxes 12 advance along a longitudinal direction X on an inlet conveyor 18, for example, a belt conveyor. The inlet conveyor 18 transports each box 12 to a tipping station 20.

The apparatus 10 picks up the box 12 which—in each case—is located in the tipping station 20 and overturns it in the manner which will be described below. During the overturning of each box 12, the products 14 come out of the upper open face of the box 12 and are collected on an outlet conveyor 22.

The tipping apparatus 10 comprises a stationary support structure 24 and a chute 26 fixed with respect to the stationary support structure 24. The chute 26 comprises an inclined surface 28 having an upper edge 30 and a lower edge 32. The lower edge 32 is located above the outlet conveyor 22. The chute 26 may have a pair of lateral sides 34 which extend on opposite sides of the inclined surface 28.

The tipping apparatus 10 comprises a movable support 36 rotatable with respect to the stationary support structure 24 around a first axis A parallel to the longitudinal direction X along which the boxes 12 move as they advance towards the tipping station 20.

The tipping apparatus 10 comprises two tipping arms 38 carried by the movable support 36 and jointly rotatable with respect to the movable support 36 about a second axis B parallel to the first axis A. The tipping arms 38 may be connected to each other by a shaft 40, which may extend along the second axis B. The tipping arms 38 are parallel to each other and extend along a transverse direction Y perpendicular to the longitudinal direction X. The tipping arms 38 are located inside the lateral sides 34 of the chute 26. The tipping arms 38 carry a first and a second guide 42, 44, which extend parallel to the longitudinal direction X. The first and second guides 42, 44 have a C-shaped cross-section and are configured to engage their respective edges 16 of a box 12 when the box, advancing along the inlet conveyor 18, enters the tipping station 20. The first and second guides 42, 44 may have respective inlet sections 46 to facilitate the insertion of the outer edges 16 of a box 12 inside the guides 42, 44.

The tipping apparatus 10 comprises a drive unit 48 configured to control the rotation of the movable support 36 relative to the stationary support structure 24 about the first axis A, and the rotation of the tipping arms 38 relative to the movable support 36 about the second axis B independently of each other.

In one possible embodiment, the drive unit 48 comprises a first rotary motor 50 carried by the stationary support structure 24 and arranged to control the rotation of the movable support 36 with respect to the stationary support structure 24 around said first axis A.

The drive unit 48 may comprise a second rotary motor 52 carried by the movable support 36 and arranged to control the joint rotation of the two tipping arms 38 with respect to the movable support 36 about the second axis B. The first and second motors 50, 52 may be associated with respective reducers.

The apparatus 10 may comprise an electronic control unit 54 which controls the first and second motors 50, 52 in a mutually coordinated manner.

The operation of the tipping apparatus 10 is as follows.

Figure 2:
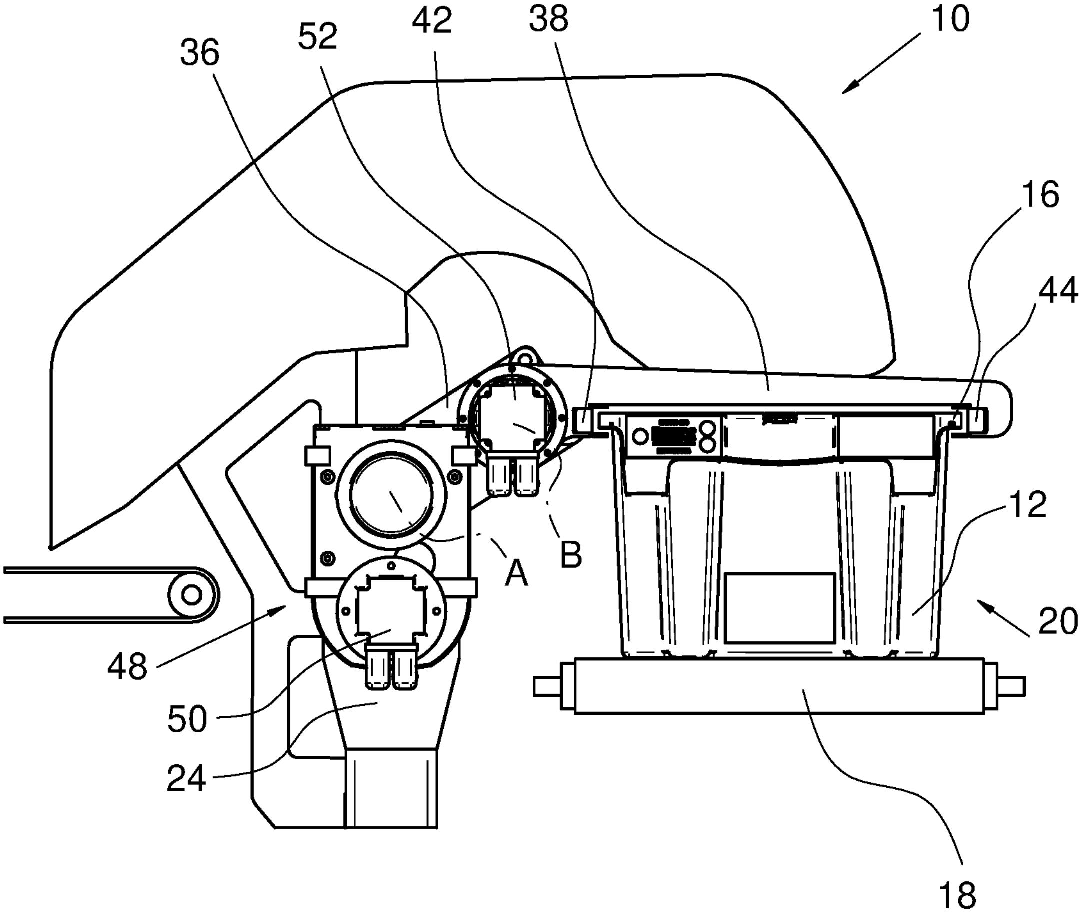
FIGS. 2, 3 and 4 are schematic side views illustrating the tipping sequence of a box.

In a first step, illustrated in FIG. 2, the apparatus 10 is in a pick-up position in which the tipping arms 38 extend above the inlet conveyor 18. The first and second guides 42, 44 are at the same distance from the inlet conveyor 18. A box 12 containing products 14 advances in the longitudinal direction X along the inlet conveyor 18. When the box 12 enters the tipping station 20, the outer edges 16 of the box 12 fit into the respective guides 42, 44. The movement in the longitudinal direction X of the box 12 stops when the box 12 is located between the two tipping arms 38. For example, sensors could be provided which detect the position of the box 12 and stop the inlet conveyor 18 when the box 12 is in the correct position.

Figure 3:
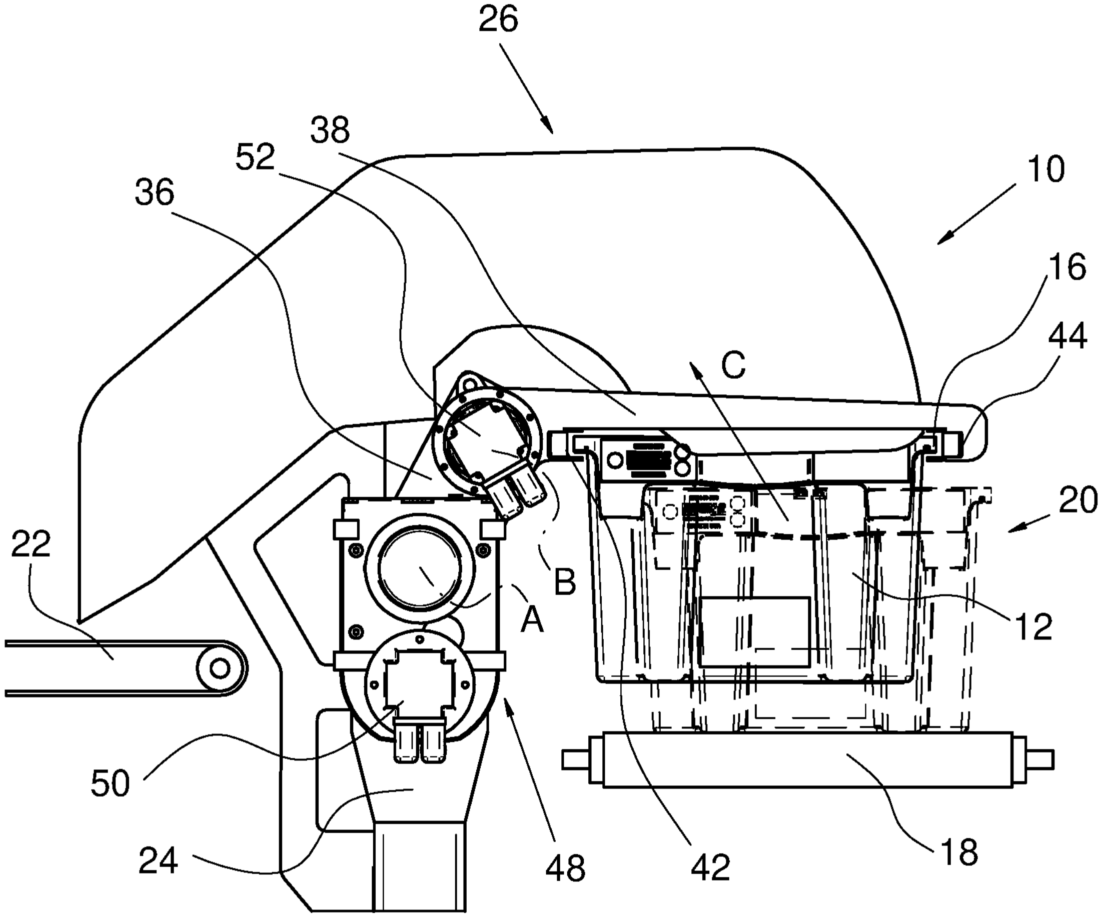
Figure 4:
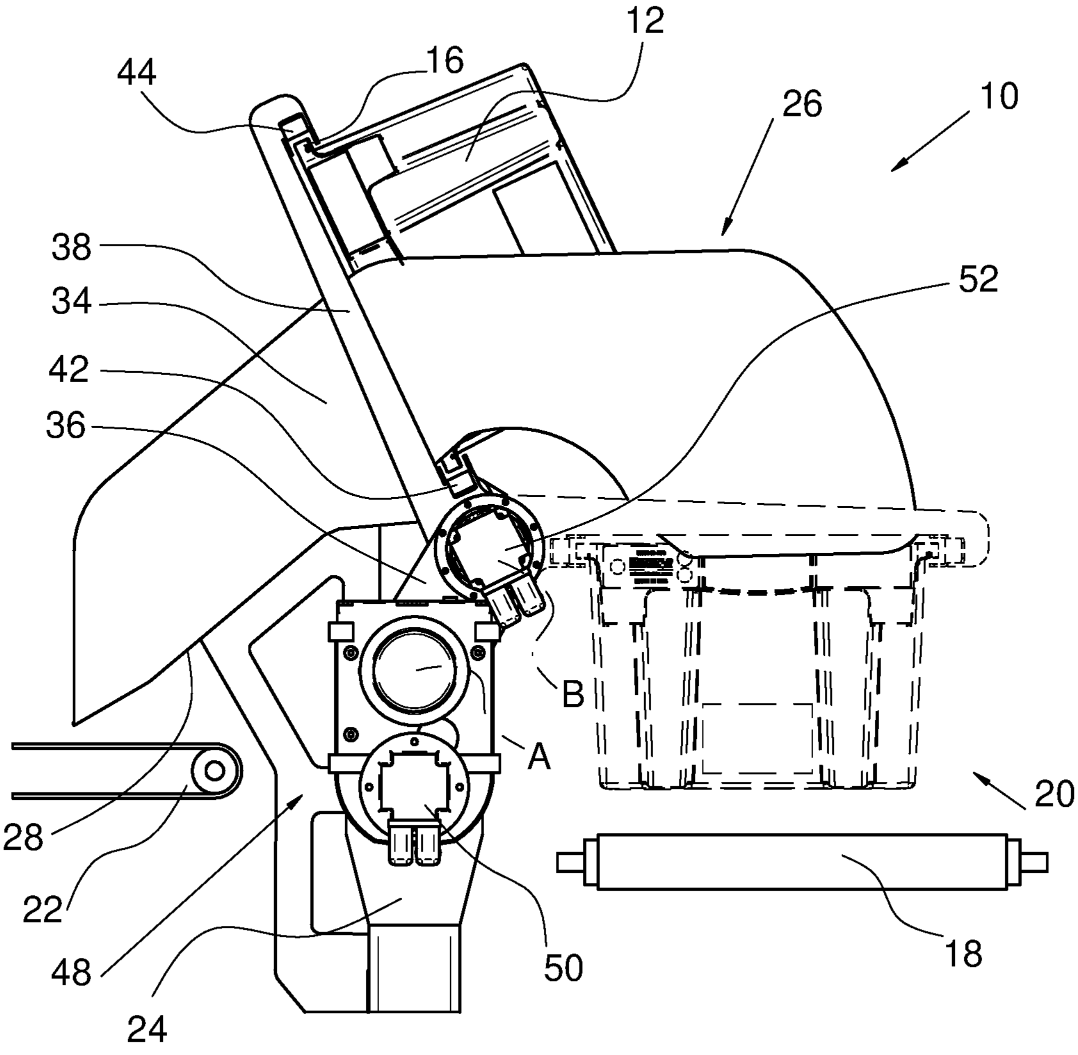

At this point, as shown in FIG. 3, the movable support 36 is driven to rotate about the first axis A in a first direction (counterclockwise in the representation of FIGS. 2, 3 and 4) and the tipping arms 38 are driven to rotate around the second axis B with respect to the movable support 36 in a second direction opposite to the first direction (clockwise in the representation of FIGS. 2, 3, 4). This actuation in opposite directions of the movable support 36 and of the tipping arms 38 causes a movement of the tipping arms 38 and of the box 12 along a straight direction C inclined upwards, so as to approach a longitudinal side of the box 12 with the upper edge 30 of the chute 26. This approach movement of the box 12 to the upper edge 30 of the chute 26 takes place without tipping the box 12, so as to avoid the risk that the products come out of the box before the box 12 is approached to the chute 26.

When the box 12 reaches the position illustrated with a dashed line in FIG. 3, the box 12 is located between the lateral sides 34 of the chute 26.

Figure 5:
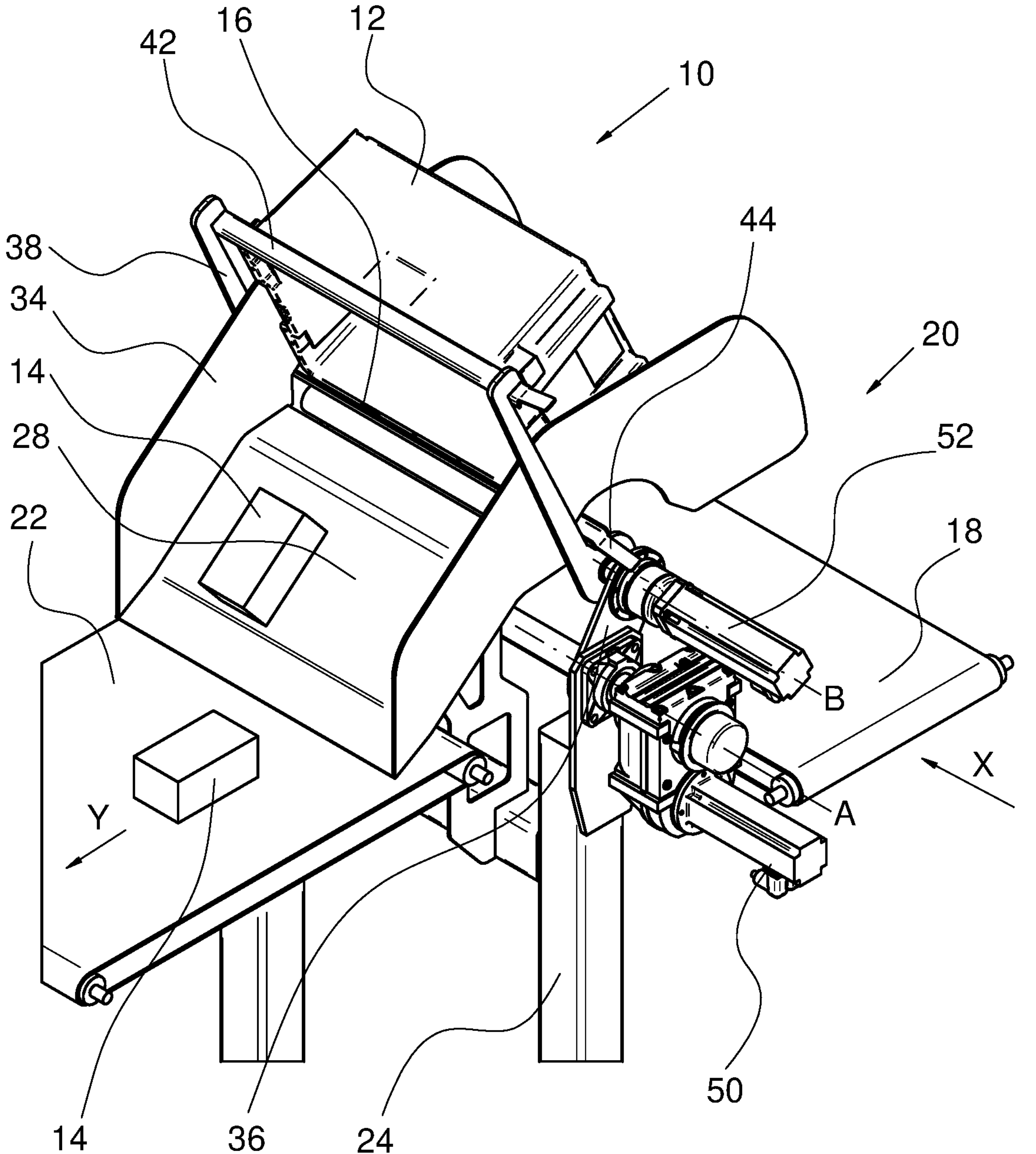
FIG. 5 is a perspective view illustrating the apparatus in the tipping position.

At this point, the tipping of the box 12 begins, as shown in FIG. 4. In this step, the movable support 36 remains stationary and the tipping arms 38 rotate with respect to the movable support 36 around the second axis B. The rotation of the tipping arms 38 around the axis B continues until the tipping position shown in FIGS. 4 and 5 is reached.

The rotation angle of the box between the pick-up position and the tipping position may be between 90°-150°. For example, in the tipping position, the box 12 may be rotated by 115° with respect to the pick-up position.

In the tipping position, the products 14 come out of the box 12 by gravity through the open upper face, slide on the inclined surface 28 of the chute 26 and reach the outlet conveyor 22 where they are transported in the Y direction.

The lateral sides 34 prevent the products 14 from falling from the side edges of the chute 26. The approach movement without rotation of the box 12 to the upper edge 30 of the chute 26 prevents the escaping of products 14 from the box 12 in the space between the box 12 and the upper edge 30 of the chute 26.

When the emptying of the box 12 has finished, the tipping arms 38 and the movable support 36 rotate around the respective axes B and A to bring the empty box back onto the inlet conveyor 18, where it is transported out of the tipping station 20. Then, a new box 12 is placed in the tipping station 20 for a new cycle. The return of the box 12 to its initial position may take place by simultaneously operating the tipping arms 38 and the main plate 36 to reduce the cycle time.

Figure 6:
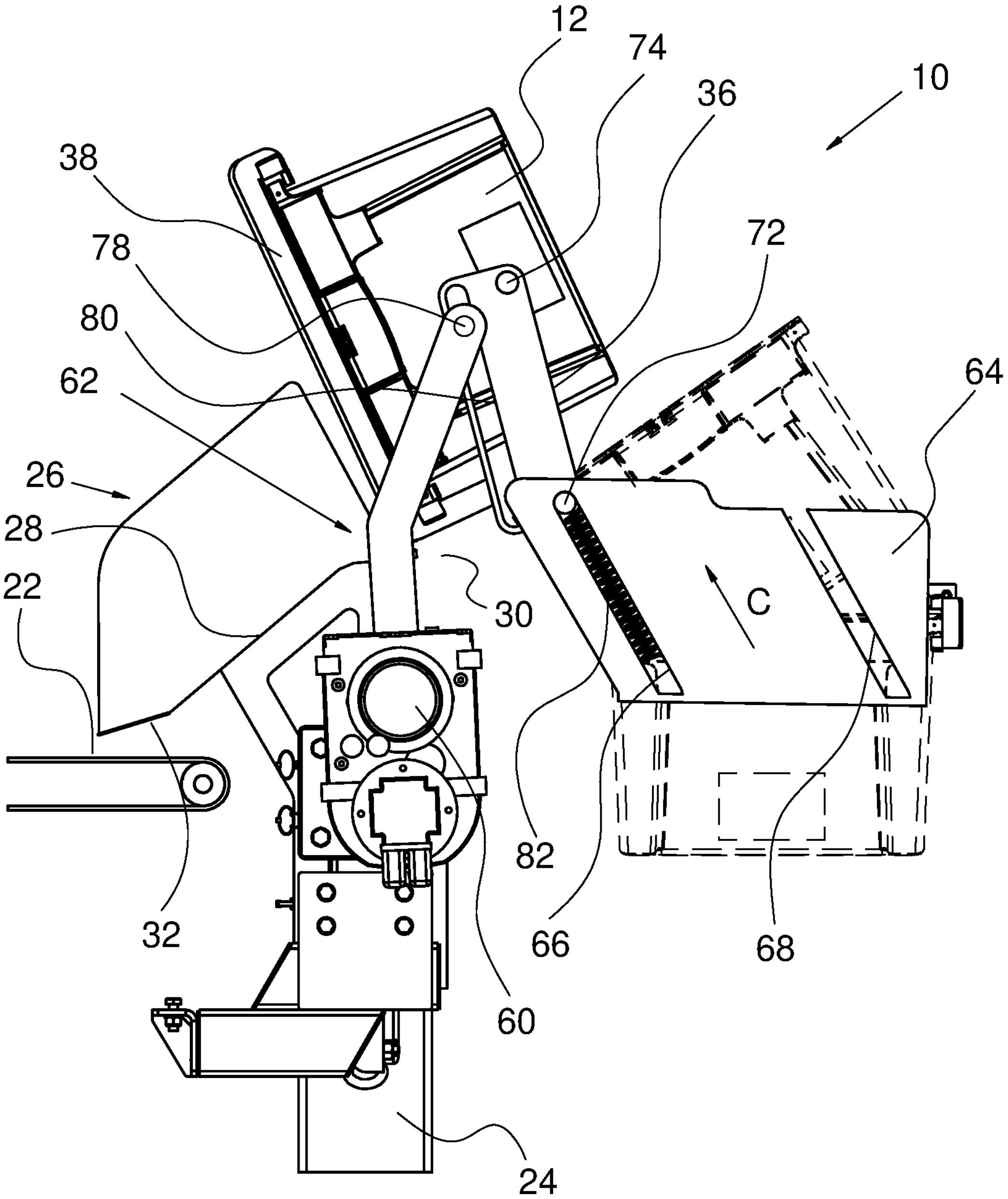
FIG. 6 is a schematic side view illustrating a second embodiment of an apparatus for tipping boxes according to the present invention.

FIG. 6 illustrates a second embodiment of an apparatus for tipping boxes according to the present invention. The elements corresponding to those previously described are indicated with the same numeral references.

With reference to FIG. 6, the drive unit 48 comprises a single motor 60 carried by the stationary support structure 24 and associated with a transmission mechanism 62 which transmits a translational and rotational movement to the movable support 36.

The transmission mechanism 62 comprises a guide plate 64 fixed with respect to the stationary support structure 24 and having a first guide 66 and a second guide 68 parallel to each other and inclined with respect to a vertical direction. The first guide 66 and the second guide 68 may be formed by respective straight slots. The first guide 66 has a closed upper end and the second guide 68 has an open upper end.

In the embodiment of FIG. 6, the movable support 36 may have the shape of a plate to which the tipping arms 38 are attached. The movable support 36 has a first engagement element 72 and a second engagement element 74, formed for example by pins, configured to engage, respectively, the first guide 66 and the second guide 68 of the guide plate 64.

The transmission mechanism 62 comprises an arm 76 fixed to the outlet shaft of the motor 60 and carrying a third engagement element 78 at its distal end—formed for example by a pin—which engages a third guide 80—formed for example by a straight slot—formed in the movable support 36.

The transmission mechanism 62 may comprise an elastic element 82 which elastically pushes the third engagement element 78 towards the upper end of the first guide 66.

During operation, in a pick-up position, the engagement elements 72, 74 engage the respective guides 66, 68 of the guide plate 64 and are located near the lower ends of the guides 66, 68.

After a box 12 has engaged the guides 40, 42 of the two tipping arms 38, the motor 60 rotates the arm 76 which, through the third engagement element 78 engaged in the third guide 80, commands an upward movement of the movable support 36.

As long as the first engagement element 72 and the second engagement element 74 are engaged in the respective guides 66, 68, the movable support 36 and the box 12 move with a translational movement along a straight direction C inclined upwards. Continuing the rotation of the arm 76, the second engagement element 74 reaches the upper end of the second guide 68 and disengages from the second guide 68 while the first engagement element 72 remains engaged with the upper end of the first guide 66. At this point, the further rotation of the arm 76 commands a rotation of the movable support 36 around an axis A passing through the first engagement element 72. The rotation of the movable support 36 around the axis A produces the tipping of the box 12.

Once the tipping of the box 12 has been completed, the arm 76 is rotated in the opposite direction, so as to bring the second engagement element 74 of the movable support 36 back into engagement with the upper end of the second guide 68 and up to depositing the empty box 12 on the inlet conveyor 18.

The embodiment of FIGS. 1-5 and the embodiment of FIG. 6 both relate to an apparatus for tipping boxes, comprising:

- a stationary support structure 24,
- a chute 26 fixed with respect to the stationary support structure 24 and including an inclined surface 28 having an upper edge 30 and a lower edge 32,
- a movable support 36 carrying two tipping arms 38, wherein the tipping arms 38 carry a first and a second guide 42, 44 extending parallel to a longitudinal direction X and configured to engage respective outer edges 16 of a box 12, and
- a drive unit 48 configured to move said tipping arms 38 with respect to the stationary support structure 24 along a straight direction C inclined with respect to a vertical direction and to rotate the tipping arms 38 with respect to the stationary support structure 24 around an axis A, B parallel to said longitudinal direction X.

In the solutions according to the present invention, the cover of the upper open face of the box 12 with a door is not provided. Therefore, the tipping cycle may begin immediately after a full box enters the tipping station 20. This allows considerable reduction of the cycle time.

The tipping arc of the box is considerably smaller than in solutions according to the prior art, which further reduces the cycle time.

In the solutions according to the prior art, the return movement of the box from the overturned position towards the initial position contributes to the transfer of the products onto the chute. Therefore, the return movement must be controlled and cannot be performed at high speed. In the solutions according to the present invention, the products are completely overturned onto the chute at the end of the tipping of the box, so that the return movement may be performed more quickly, which further contributes to a reduction in the cycle time.

All these characteristics combine to obtain more efficient dynamics of the tipping system, which requires less energy and lower torques thanks to lower rotation angles and smaller rotation arms that are closer to the box (lower torque/power demand).

A particularly advantageous characteristic of the solution according to the present invention is that the combination of the two rotational movements around the axes A and B generates a movement profile very similar to that which would be implemented by an operator who had to manually perform the tipping, minimizing the forces involved.

Of course, without prejudice to the principle of the invention, the details of construction and the embodiments can be widely varied with respect to those described and illustrated, without thereby departing from the scope of the invention as defined by the claims that follow.

The invention claimed is:

1. An apparatus for tipping boxes, comprising:

- a stationary support structure,
- a chute fixed with respect to the stationary support structure and including an inclined surface having an upper edge and a lower edge,
- a movable support carrying two tipping arms, wherein the tipping arms carry a first and a second guide extending parallel to a longitudinal direction and configured to engage respective outer, upper opposed edges of a box, the first and second guides being spaced apart from each other in a direction perpendicular to the longitudinal direction, and
- a drive unit configured to move said tipping arms with respect to the stationary support structure along a straight direction inclined with respect to a vertical direction and to rotate the tipping arms with respect to the stationary support structure around an axis parallel to said longitudinal direction,
- wherein the movable support is rotatable with respect to the stationary support structure about a first axis parallel to said longitudinal direction, and wherein the tipping arms are rotatable jointly with respect to the movable support around a second axis parallel to said first axis, and wherein the drive unit is configured to control rotation of the movable support with respect to the stationary support structure around said first axis and rotation of the tipping arms with respect to the movable support around said second axis independently from each other,
- wherein said drive unit comprises a first rotary motor fixed with respect to said stationary support structure and arranged to control the rotation of said movable support with respect to the stationary support structure around said first axis, and
- wherein said drive unit comprises a second rotary motor carried by said movable support and arranged to control the rotation of said tipping arms with respect to the movable support around said second axis.

2. The apparatus of claim 1, wherein said first and second rotary motors are controlled to actuate the movable support and the tipping arms in opposite directions to each other so as to move the box along said straight direction, inclined with respect to a vertical direction and without rotation of the box up to a position wherein one of the outer, upper opposed edges of the box is adjacent to the upper edge of said chute.

3. The apparatus of claim 1, wherein said drive unit is controlled to stop the rotation of said movable support and to control the rotation of said tipping arms so as to overturn the box around said second axis.

4. The apparatus of claim 1, wherein said chute comprises a pair of lateral sides located on opposite sides of said inclined surface and extending vertically upward from the inclined surface to a top edge, and wherein said tipping arms extend outside with respect to said pair of lateral sides, and said box, in an overturned or tipped position, extends inside of the pair of lateral sides and below the top edge of the pair of lateral sides.

5. The apparatus of claim 1, comprising an inlet conveyor arranged to advance the boxes in the longitudinal direction and an outlet conveyor arranged to advance products released from the boxes along a transverse direction perpendicular to said longitudinal direction.

* * * * *